(12) United States Patent
Antonelli et al.

(10) Patent No.: US 11,162,897 B2
(45) Date of Patent: Nov. 2, 2021

(54) OPTICAL METROLOGY DEVICE USING NUMERICAL APERTURE REDUCTION

(71) Applicant: Onto Innovation Inc., Wilmington, MA (US)

(72) Inventors: George Andrew Antonelli, Portland, OR (US); Troy Daniel Ribaudo, Beaverton, OR (US); Michael J. Hammond, Norton (GB)

(73) Assignee: Onto Innovation Inc., Wilmington, MA (US)

( * ) Notice: Subject to any disclaimer, the term of this patent is extended or adjusted under 35 U.S.C. 154(b) by 0 days.

(21) Appl. No.: 15/931,297

(22) Filed: May 13, 2020

(65) Prior Publication Data

US 2020/0363332 A1 Nov. 19, 2020

Related U.S. Application Data

(60) Provisional application No. 62/848,300, filed on May 15, 2019.

(51) Int. Cl.
*G01N 21/47* (2006.01)
*G01B 11/24* (2006.01)

(52) U.S. Cl.
CPC ......... *G01N 21/4785* (2013.01); *G01B 11/24* (2013.01); *G01N 2201/068* (2013.01)

(58) Field of Classification Search
CPC .... G01B 11/24; G01B 11/02; G01B 2210/56; G01B 11/0641; G01N 2201/068; G01N 21/4785

USPC ............... 356/243.4, 243.7, 237.1–237.6, 356/239.1–239.8
See application file for complete search history.

(56) References Cited

U.S. PATENT DOCUMENTS

| | | | |
|---|---|---|---|
| 5,436,716 A * | 7/1995 | Stein | G02B 6/06 |
| | | | 250/227.2 |
| 6,525,806 B1 | 2/2003 | Smith | |
| 6,750,968 B2 | 6/2004 | Sandusky | |
| 6,894,834 B2 | 5/2005 | Mann et al. | |
| 6,924,893 B2 | 8/2005 | Oldenbourg et al. | |
| 6,943,880 B2 | 9/2005 | Kanzaki | |
| 7,457,034 B2 | 11/2008 | Chuang et al. | |

(Continued)

OTHER PUBLICATIONS

International Search Report and Written Opinion dated Sep. 1, 2020, PCT/US2020/032989, filed May 14, 2020.

*Primary Examiner* — Tri T Ton
(74) *Attorney, Agent, or Firm* — Paradice and Li LLP

(57) ABSTRACT

A metrology device that can determine at least one characteristics of a sample is disclosed. The metrology device includes an optical system that uses spatially coherent light with a first and a second objective lens as well as a detector that detects light reflected from the sample. The objective lenses use numerical apertures sufficient to produce a small probe size, e.g., less than 200 μm, while a spatial filter is used to reduce the effective numerical aperture of the optical system as seen by the detector to avoid loss of information and demanding computation requirements caused by the large angular spread due to large numerical apertures. The spatial filter permits light to pass in a desired range of angles, while blocking the remaining light and is positioned to prevent use of the full spatial extent of at least one of the first objective lens and the second objective lens.

17 Claims, 8 Drawing Sheets

(56) References Cited

U.S. PATENT DOCUMENTS

| | | |
|---|---|---|
| 8,013,996 B1 | 9/2011 | Liphardt et al. |
| 8,189,202 B2 | 5/2012 | Liesener et al. |
| 8,248,617 B2 | 8/2012 | De Groot et al. |
| 8,854,628 B2 | 10/2014 | Colonna de Lega et al. |
| 9,080,971 B2 | 7/2015 | Kandel et al. |
| 9,115,987 B2 | 8/2015 | Liu et al. |
| 2002/0027657 A1 | 3/2002 | Mikkelsen et al. |
| 2004/0125373 A1 | 7/2004 | Oldenbourg et al. |
| 2005/0219518 A1* | 10/2005 | Korngut ............ G01N 21/4788 356/237.2 |
| 2006/0232867 A1 | 10/2006 | Mann et al. |
| 2012/0224183 A1 | 9/2012 | Fay et al. |
| 2013/0021588 A1 | 1/2013 | Matsumoto et al. |
| 2015/0022796 A1 | 1/2015 | Yamaguchi et al. |
| 2015/0285735 A1 | 10/2015 | Wang et al. |
| 2019/0285407 A1 | 9/2019 | Chuang et al. |

\* cited by examiner

OPTICAL METROLOGY DEVICE USING NUMERICAL APERTURE REDUCTION

CROSS REFERENCE TO RELATED APPLICATIONS

This application claims priority under 35 USC § 119 to U.S. Provisional Application No. 62/848,300, entitled "OPTICAL METROLOGY SYSTEM USING NUMERICAL APERTURE REDUCTION," filed May 15, 2019, which is incorporated herein by reference in its entirety.

FIELD OF THE DISCLOSURE

The present invention is related to optical metrology, and in particular to an optical system for an optical metrology device.

BACKGROUND

The semiconductor industry, as well as other complex nanotechnology process industries, requires very tight tolerances in process control. As dimensions of chips continue to shrink, the tolerance requirements continue to become tighter. Accordingly, new more precise ways of measuring very small dimensions, e.g., on the order of a few nanometers, are desired. At this scale, typical microscopies, such as optical microscopy, or Scanning Electron Microscopy, are not suitable to obtain the desired precision, or to make quick, non-invasive measurements, which are also desirable.

Optical metrology techniques have been presented as a solution. The basic principle of optical metrology techniques is to reflect and/or scatter light from a target, and measure the resulting light. The received signal can be based simply on the reflectance of the light from the sample, or the change in polarization state (Psi, Delta) of the light caused by the sample. The light may be modeled to retrieve the geometries or other desired parameters of the illuminated sample.

With the continuously shrinking of critical dimensions in semiconductor devices and the industry moving to 3D device structures, optical metrology that is used to measure device structure parameters is facing more and more challenges due to lack of parameter sensitivity or strong parameter correlations. Continued improvements in optical metrology are therefore desirable.

SUMMARY OF THE DISCLOSURE

The effective numerical aperture of an optical system of an optical metrology device as seen by the detector is reduced with a spatial filter. The optical metrology device includes an optical system that focuses spatially coherent light into a small probe size one a sample and detects the reflected light. The spatial filter permits light to pass in a desired range of angles, while blocking the remaining light and is positioned to prevent use of the full spatial extent of a primary objective lens and/or the receiving objective lens. The objective lenses may have matching numerical apertures that is sufficient to produce a small probe size, e.g., less than 200 μm in the largest dimension. The spatial filter reduces the effective numerical aperture of the optical system as seen by the detector to avoid loss of information due to feature spreading in the reflected light and demanding computation requirements caused by the large angular spread caused by a numerical aperture. The spatial filter, for example, may include an aperture that permits light to pass at a small range of angles of incidence, but with a relatively large range of azimuth angles. In other implementations, the spatial filter may include an aperture that permits light to pass at a small range of azimuthal angles but with a relatively large range of angles of incidence. In other implementations, the spatial filter may limit both the angles of incidence and azimuthal angles to a limited range. Additionally, the spatial filter may include multiple apertures that permit light to pass at separate angles of incidence or azimuthal angles, and a moveable cover may be used to select one of the multiple apertures through which light may pass.

In one implementation, an optical metrology device for measuring at least one characteristic of a target, may include an optical system including a first objective lens that is configured to receive coherent light and focus the coherent light to be obliquely incident on the target. The optical axis of the first objective lens is at an angle of incidence and an azimuthal angle with respect to the target. At least a portion of coherent light is reflected. A second objective lens is configured to receive the coherent light that is reflected. A detector is configured to receive the coherent light that is reflected and produce signals in response. The metrology device may include a spatial filter that is configured to reduce an effective numerical aperture of the optical system as seen by the detector. The spatial filter is positioned in the optical system between an input of the first objective lens and the detector. The spatial filter blocks a portion of the coherent light from exiting the spatial filter and permits another portion of the coherent light to pass. At least one processor coupled to receive the signals from the detector is configured to determine at least a characteristic of the target using the signals from the detector.

In one implementation, a method for performing optical measurements of at least one characteristic of a target performed by an optical metrology device having an optical system, includes focusing coherent light that is to be obliquely incident on the target along an optical axis that is at an angle of incidence and an azimuthal angle with respect to the target using a first objective lens. At least a portion of the coherent light is reflected from the target, and is received with a second objective lens. An effective numerical aperture of the optical system as seen by a detector is reduced by blocking a first portion of the coherent light and passing a second portion of the coherent light between an input of the first objective lens and a detector. The coherent light is detected by the detector and used to determine at least a characteristic of the target.

In another implementation, an optical metrology device for measuring at least one characteristic of a target includes an optical system that includes a first objective lens that is configured to receive coherent light and focus the light to be obliquely incident on the target, wherein an optical axis of the first objective lens is at an angle of incidence and an azimuthal angle with respect to the target. At least a portion of coherent light is reflected. A second objective lens is configured to receive the coherent light that is reflected. A detector is configured to receive the coherent light that is reflected and produces signals in response. The optical metrology device includes a means for reducing the effective numerical aperture of the optical system as seen by the detector. At least one processor that is configured to determine at least a characteristic of the target using the signals from the detector.

DETAILED DESCRIPTION

Figure 1:
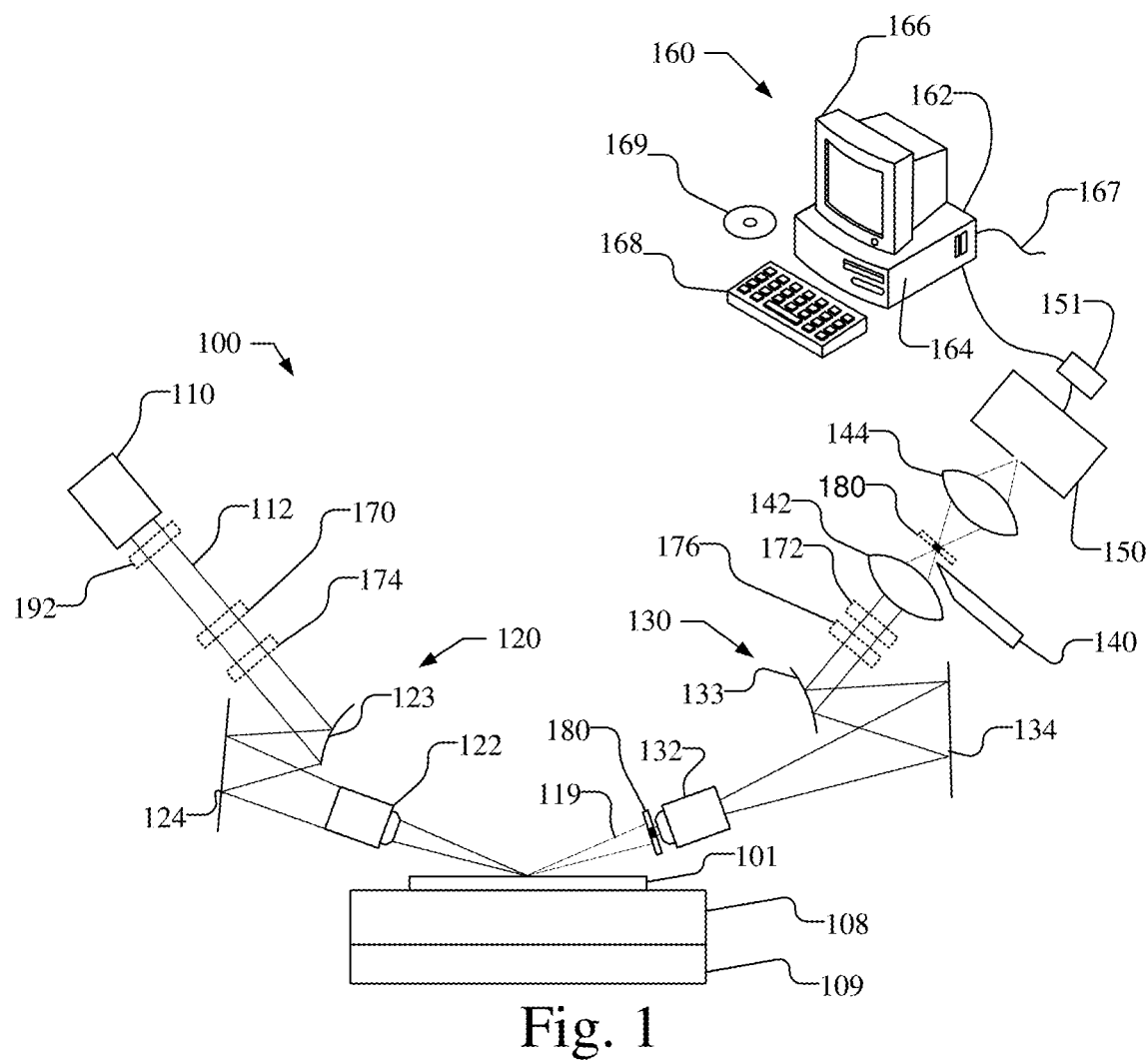
FIG. 1 illustrates a schematic view of an optical metrology device with an optical system having a reduced effective numerical aperture.

Optical metrology is used for non-contact measurement of sensitive samples, such as semiconductor devices, flat panel displays, etc. Often optical metrology is used during substrate processing to evaluate semiconductor devices during fabrication. With optical metrology, a sample is illuminated with light, which is typically reflected or scattered by the sample. After interacting with the sample, the resulting light may be detected and analyzed to determine a desired characteristic of the sample. For example, a modelling process may be used for analysis, in which a model of the sample having a variable parameter (or multiple variable parameters) is used to calculate a predicted response to light at different values for each of the variable parameters. The measured response from the sample under test may be compared to the calculated responses to find a best fit. The value of the variable parameter that corresponds to the best fit may be considered to represent the measured characteristic of the sample.

Different types of optical metrology devices may be used to non-contact measurement of samples, such as e.g., reflectometers, ellipsometers, scatterometers, interferometers, etc. Some optical metrology devices may illuminate the device and simply measure reflectance or intensity values. Other devices may polarize the light in various ways to measure the change in polarization state (Psi, Delta) of the light caused by the sample. Further, optical metrology devices may operate at a single wavelength or narrowband of wavelengths, while other devices may operate at a plurality of wavelengths (spectroscopic).

The optical system for optical metrology devices typically focus the light into a small probe (spot) size on the sample. Optical systems may include an objective lens with a large numerical aperture (NA) to produce the small spot size and resolve finer details than possible with a smaller numerical aperture. The use of a large numerical aperture, however, can lead to an increased angular spread of light. In other words, a lens with a large numerical aperture has a larger cone of light with a greater spread of angles than a lens with a smaller numerical aperture. Accordingly, an objective lens with a large numerical aperture produces light over a large range of angles of incidence and azimuthal angles compared to an objective lens with a small numerical aperture. Light with a large range of angles of incidence and azimuthal angles, however, may lead to difficulty in calculating resulting light. Even more problematic, however, is that a large range of angles of incidence and azimuthal angles may cause features may smear in the raw data, which may not be recovered through processing.

Some optical metrology devices, particularly those operating with mid infrared ranges typically rely on a relatively large probe size, e.g., on the order of one or more millimeters, with a single angle of incidence in a given configuration or have minimal modeling requirements. Such conventional instruments do not experience difficulties with respect to a small probe size as discussed above.

It may be desirable, however, to focus incident light to a small probe size on the sample, but also to limit the range of angles of incidence and/or azimuthal angles that are detected, e.g., to avoid loss of information due to smearing of the signal and demanding computation requirements. One way of achieving this is to use an unbalanced set of objectives, e.g., one objective lens has a high numerical aperture input and the other objective lens has a low numerical aperture output. The use of an unbalanced set of objectives, however, requires custom designed objective lenses and is difficult and expensive to achieve, particularly for reflective objectives.

In accordance with one implementation, the effective numerical aperture of the optical system as seen by the detector may be reduced while still producing a small probe size on the sample, by limiting the range of angles of incidence and/or the range of azimuthal angles to pass through the optical system. The effective numerical aperture may be reduced using a spatial filter within the optical system. The spatial filter permits some light to pass at a desired first range of angles of incidence, a desired range of azimuthal angles, or a combination thereof, while light outside the desired ranges of angles of incidence or azimuthal angles is blocked. The spatial filter, for example, may be located between the input of the primary objective lens and the detector, e.g., at either the input or output of the primary focusing objective lens or the receiving objective lens, or at a conjugate plane between two focusing elements between the receiving objective lens and the detector. Spatially coherent light may be used with the spatial filter. The spatial filter, for example, may include an aperture that permits light to pass at a small range of angles of incidence, but with a relatively large range of azimuth angles. In other implementations, the spatial filter may include an aperture that permits light to pass at a small range of azimuthal angles but with a relatively large range of angles of incidence. In other implementations, the spatial filter may limit both the angles of incidence and azimuthal angles to a limited range. Additionally, the spatial filter may include multiple apertures that permit light to pass at separate angles of incidence or azimuthal angles, and a moveable cover may be used to select one of the multiple apertures through which light may pass.

The spatial filter is used herein to reduce the effective numerical aperture of the optical system, while enabling a small probe size. In comparison, aperture stops or field stops are sometimes used conventionally in relation to objective lenses, e.g. to prevent stray light, such as unintended reflections or diffractions from entering the optical system, but not to reduce the numerical aperture of the optical system. Other uses of aperture stops, for example, include reducing or eliminating artifacts or cleaning up the spatial mode of probe beams from a laser. Such systems, thus, use aperture stops for quality control of the probe beam or received beam, but not to reduce the effective numerical aperture of the optical system.

FIG. 1 illustrates a simplified schematic view of an optical metrology device 100 that includes an optical system have a reduced effective numerical aperture to determine characteristics of a sample 101, which sometimes may be referred to herein as a target. The optical metrology device 100 may be configured to perform, e.g., reflectometric or ellipsometric including Mueller Matrix ellipsometric, measurements of the sample 101.

Optical metrology device 100 includes a light source 110 that produces spatially coherent light 112. In some implementations, the light 112 may be infrared light, e.g., in the mid-infrared spectral region or other regions of the infrared spectrum. For example, light source 110 may produce infrared light having wavelengths between 2.5 μm and 30 μm, or more particularly between 5 μm and 13 μm, or other desired ranges. If desired, however, other wavelengths of light, e.g., in the ultraviolet, visible, or near infrared spectral regions may be used. The light 112 produced by light source 110 may include a range of wavelengths, i.e., broadband, or may be monochromatic. For example, the light source 110 may be tunable to sequentially produce light with different wavelengths in a desired spectral range. By way of example, the light source 110 may be a coherent, broadly tunable laser based emitter that provides a suitable average power, e.g., greater than 1 mW at the sample, and more particularly 10-100 mW, for signal to noise (SNR) considerations. For example, light source 110 may be a tunable Quantum Cascade Laser (QCL), which produces infrared light in the desired wavelengths. In one implementation, the QCL light source 110 may be the type purchased from Block Engineering, LLC, DRS Daylight Solutions, or Pranalytica. In another implementation, the light source 110 may be, e.g., optical parametric oscillator (OPO) or amplifiers (OPA), or a frequency comb laser source paired with a monochromator. The repetition rate of a laser based light source should be greater than 1 MHz or a continuous wave methodology may be used. Lower repetition rates may be used, e.g., less than 500 kHz, however, the timing of the modulated must be synchronized with the light source using a triggering system. If desired, light source 110 may be other coherent sources of different wavelengths.

The optical metrology device 100 includes an optical system with focusing optics 120 that focus the light 112 and direct the light to be obliquely incident on a top surface of the sample 101. The focusing optics 120 may be refractive, reflective, or a combination thereof. Focusing optics 120 may be an objective lens 122, and reflective optical elements 123 and 124. The objective lens 122 focuses the light 112 and directs the light to be obliquely incident on the sample 101 at an angle of incidence between 30° and 70° or any other desired angle. The objective lens 122 may have a bare or protected Gold or Aluminum coating on a metal or glass substrate. The objective lens 122 may be a Schwarzschild objective, spherical, elliptical, off-axis parabolic mirrors or combinations thereof. Moreover, additional or fewer reflective optical elements may be used for the focusing optics 120. If desired, refractive optics may be additionally or alternatively used in the focusing optics 120. Refractive optics may be made of a materials including, but not limited to, Zinc Selenide, Silicon, Germanium, Magnesium Fluoride, Barium Fluoride, or Calcium Fluoride.

The reflected light 119 from the sample 101 is received by another set of focusing optics 130. As with focusing optics 120, the focusing optics 130 receiving the reflected light 119 may be refractive, reflective, or a combination thereof. For example, focusing optics 130 include an object lens 132 that matches the objective lens 122 if used for focusing optics 120. Focusing optics 130 are illustrated as including reflective optical elements 133 and 134. The objective lens 132 may have a bare or protected Gold or Aluminum coating on a metal or glass substrate. The objective lens may be a Schwarzschild objective, spherical, elliptical, off-axis parabolic mirrors or combinations thereof. Moreover, additional or fewer reflective optical elements may be used for the focusing optics 130. If desired, refractive optics may be additionally or alternatively used in the focusing optics 130. Refractive optics may be made of a materials including, but not limited to, Zinc Selenide, Silicon, Germanium, Magnesium Fluoride, Barium Fluoride, or Calcium Fluoride.

The objective lenses 122 and 132 may be matching objective lenses, e.g., with the same numerical aperture. By way of example, the numerical aperture of the objective lenses 122 and 132 may be 0.3, which is a relatively large value for an ellipsometer. Because an oblique angle of incidence is used, the measurement spot may be unsymmetrical, but the numerical aperture of the objective lenses 122 and 132, for example, may be sufficient to focus the light into a measurement spot less than 200 μm in its largest dimension. In some implementations, the numerical aperture may be sufficient to focus the light into a measurement spot that is 100 μm or less, e.g. 50μ, in its largest dimension. The objective lenses 122 and 132 may be Schwarzschild type objective, but other types of objectives may be used.

A spatial filter 180 may be positioned in the optical path and serves as a means to reduce the effective numerical aperture of the optical system as seen by the detector 150. As illustrated, the spatial filter 180 may be located at the input side of the receiving objective lens 132, but may be located between the input of the primary objective lens 122 and the detector 150. The input of the primary objective lens 122 is a back focal plane. The spatial filter 180 may be positioned at one of the back focal plane of the primary objective lens 122, between the first objective lens and the second objective lens, at the back focal plane of the receiving objective lens 132, and between the receiving objective lens 132 and the detector 150 in a conjugate plane between two focusing elements 142 and 144. The spatial filter 180 includes one or more apertures that permit some light to pass at a desired first range of angles of incidence, a desired range of azimuthal angles, or a combination thereof, while light outside the desired ranges of angles of incidence or azimuthal angles is blocked. With the use of a spatial filter 180 that limits the range of angles of incidence and/or azimuthal angles, e.g., to a designed angle±2.5°, the effective numerical aperture of the optical system may be reduced to, e.g., 0.1. By positioning the spatial filter 180 after the sample in the optical path, the relatively large numerical aperture of the primary objective lens 122 may advantageously produce a small spot on the sample, while the spatial filter 180 reduces the effective numerical aperture of the optical system as received or seen by the detector 150. The spatial filter 180 may be positioned before the sample 101, e.g., at the input or output of the primary objective lens 122, which will likewise reduce the effective numerical aperture of the optical system, but because the spatial filter 180 reduces the numerical aperture of the primary objective lens 122, the spot size on the sample 101 may be increased.

A detector 150 receives the resulting reflected light 119, e.g., after passing through the spatial filter 180, and thus, sees an effective numerical aperture of the optical system that is reduced in relation to what the detector 150 would see if the spatial filter 180 is not present. The detector 150, for example, detects light in the image plane. The detector 150 may include one or more single pixel photodetector elements, e.g., a monolithic chip with a single pixel that is sensitive to infrared light. The size of the detector element may be selected to be consistent with the beam size at the plane of the detector element. The detector 150 should be matched to the output range of the light source 110. For example, a charge-coupled device (CCD) type or complementary metal-oxide-semiconductors (CMOS) type detectors are typically manufactured with silicon, and are thus not appropriate for detecting infrared wavelengths. A variety of materials and detector configurations are appropriate for specific ranges within the infrared. For example, a thermoelectrically cooled (TEC) Mercury Cadmium Telluride (MCT) detector may be used with a light source that produces a wavelengths in a mid-infrared spectral region, e.g., approximately 5 µm to 13 µm. A liquid nitrogen cooled MCT detector may be used for low signal levels, or Deuterated-Triglycine Sulfate based elements (DTGS) for applications with high reflection values and potential MCT detector saturation. In embodiments where the wavelength range is approximately 2 µm to 5 µm, Lead Selenide (Pb Se), Indium Antimonide (InSb), or Indium Gallium Arsenide (InGaAs) based detectors may be used for enhanced detectivity. The signal output from the detector 150 may be pre-amplified with a transimpedance amplifier 151.

It should be understood that there may be additional optical elements in the beam path of the optical metrology device 100. For example, the optical assembly of optical metrology device 100 may be configured so that reflections from the back side of the sample or the chuck 108 under the sample 101 are eliminated. As illustrated in FIG. 1, a knife edge 140 may be included to block the back side reflections, while allowing the sample reflections to pass. The knife edge 140 may be located at a point in the optical system of the optical metrology device 100 where the sample reflection and the back side reflection may be isolated from each other. FIG. 1, for example, illustrates a knife edge 140 generally disposed between the sample 101 and the detector 150, e.g., between the receiving focusing optics 130 and a detector 150 or between a polarizer (analyzer) if used and the detector 150. As illustrated, the knife edge 140 may be between lenses 142 and 144 and may be located at the focal plane of the lens 142, which images the sample reflection and the back side reflection. The knife edge 140 blocks the back side reflection, i.e., the reflected light from the bottom surface of the sample 101. The lens 144 thus receives the sample reflection, but not the back side reflection, and provides the sample reflection to the detector 150. Accordingly, the back side reflection, which is blocked by the knife edge 140, is not received by the detector 150.

The optical system may include additional optical elements in the beam path after the light source 110 to expand the light 112 to allow the focusing optics 120 to achieve a desired optical spot size on the sample 101. Moreover, the optical system may include additional optical elements in the beam path before the detector 150, such as a beam expansion or reduction system, to alter the size of the beam, e.g., to make it commensurate with the detector element size. The beam expansion or reduction systems may include one or more refractive optics that may be manufactured from, e.g., bare or protected Gold or Aluminum coating on a metal or glass substrate and/or reflective optics, that may be manufactured from, e.g., Zinc Selenide, Silicon, Germanium, Magnesium Fluoride, Barium Fluoride, or Calcium Fluoride.

Additionally, one or more polarizing elements may be in the beam path of the optical metrology device 100. For example, as illustrated with dotted lines in FIG. 1, optical metrology device 100 may include one or both (or none) of a polarizing element 170 in the beam path before the sample 101, and a polarizing element (analyzer) 172 in the beam path after the sample 101. For example, Zinc Selenide wire grid polarizers may be used to control the input polarization state as well as the final state of the beam before it excites the detecting element in detector 150. If the optical metrology device 100 uses a polarizing element, e.g., as part of an ellipsometric measurement system, accurate operation is dependent on the polarization controlling component. For example, a high extinction ratio, e.g., greater than 10000 to 1, and transmission efficiency of the polarization controlling components is desirable for measurement accuracy and signal to noise ratio (SNR).

In addition, the optical metrology device 100 may include one or more phase modulators, such as photoelastic modulators (PEMs), electrooptic modulators, or rotating compensators, in the beam path. For example, FIG. 1 illustrates, with dotted lines, a PEM 174 in the beam path before the sample 101, and a PEM 176 in the beam path after the sample 101, which none, either or both may be present in the optical metrology device 100. The function of the PEM 174, for example, is to generate a time dependent polarization to the light beam at the detector 150, either before or after reflecting off the sample 101, or both before and after reflecting off the sample 101, depending on the geometry. The time dependent nature is such that the beam oscillates between linearly polarized and circularly polarized states with a known frequency, e.g., on the order of 50 kHz. Where one or more PEMs 174 and 176 are used, the time response of the detector 150 should be sufficient to respond to the modulation rate of the PEMs. The transimpedance amplifier 151 that pre-amplifies the signal output from the detector 150 may have a bandwidth that is at least twice the modulation frequency of the PEM, e.g., and may be 200 kHz or greater. It should be understood that while PEMs 174 and 176 are illustrated, the phase modulators may be electrooptic modulators or other appropriate types of modulators.

The one or more PEMS 174, 176 may be adjusted such that each wavelength of light that is sequentially produced by the tunable light source 110 has the same retardation of polarization at each wavelength. For example, the voltage applied to the PEMs 174 and/or 176 may be set to a specific value for each different wavelength produced by the light source 110 to achieve the same retardation. Thus, with a wavelength variable light source 110, such as a tunable QCL, the desired retardation and wavelength are inputs used to set the voltage applied to the transducers in the body of the PEM. The general scheme, therefore, requires that the wavelength of the light source 110, e.g., the tunable QCL, be tuned and the voltage on the PEM 174 and/or 176 be adjusted simultaneously to create the same retardation, such as quarter wavelength, across the spectral range of the light source 110, i.e., sequential not parallel operation. The sequential operation of the system may be dictated by the tunable nature of the light source 110. The desired retardation and wavelength are inputs used to set the voltage applied to the transducers in the body of the PEM. The calibration of the voltage applied to the transducers in the body of the PEM may be performed by measuring transmission through the entire optical system with specific polarizer and modulator orientations. If two PEMs 174 and 176 are used, the modulation frequencies may differ by a few kHz or more. The body of the PEMs used in the optical metrology device 100 may be, e.g., Zinc Selenide.

If desired, a rotating compensator may be used for retardation instead of a PEM. A rotating compensator operates at a much lower frequency compared to PEMs (<1 kHz vs 50 kHz) and therefore may reduce throughput compared to use of PEMs. However, multiple wavelengths may be simultaneously retarded with a rotating compensator. Use of a rotating compensator could be used to multiplex the system provided the use of multiple light sources and detectors or an array detector.

It should be understood that the optical assembly in the optical metrology device 100 may have a variety of configurations and operational modes and is not limited to that shown in FIG. 1. The metrology device 100 may be configured as a reflectometer including a light source 110, focusing optics 120, sample 101, receiving focusing optics 130, and detector 150, and may or may not include the use of a polarizing element 170. In an ellipsometer configuration, the metrology device 100 may include a light source 110, a polarizing element 170, a PEM 174 (or compensator) or PEM 176 (or electrooptic modulator or rotating compensator), focusing optics 120, sample 101, receiving focusing optics 130, an analyzer (polarizing element) 172, and detector 150. In a Mueller Matrix ellipsometer configuration, the metrology device 100 may include a light source 110, a polarizing element 170, a PEM 174 (or electrooptic modulator or rotating compensator), focusing optics 120, sample 101, receiving focusing optics 130, a second PEM 176 (or electrooptic modulator or rotating compensator), an analyzer (polarizing element) 172, and detector 150.

The operation and analysis of the reflectometers, ellipsometers, and the Mueller Matrix ellipsometer will be well understood to those of ordinary skill in the art in light of the present disclosure. For example, the voltage output from the detector 150 may be monitored to extract the DC as well as the 1st and 2nd harmonic at the PEM modulation frequency in the case of a single modulator. The DC signal may be extracted by including an optical chopper 192 after the light source 110 or directly monitoring the DC voltage of the detector. If two modulators are used, they may have different resonant frequencies and the voltage may be monitored at DC, 1st and 2nd harmonic, the sum and difference frequencies of the two modulators, as well as the twice the sum and difference frequencies. With a single PEM, the conventional ellipsometric values of N, C and S may be extracted, as will be understood by those of ordinary skill in the art. Further, through incorporation of a second PEM in the optical path after the beam has reflected off the sample and preceding the analyzing linear polarizer, eight components of the Mueller Matrix may be simultaneously measured, as will be understood by those of ordinary skill in the art. By further extension, the use of four PEMs would allow simultaneous measurement of all components of the Mueller Matrix.

The detector 150 generates a plurality of output signals from the detected light that is received by the processor 160. The output signals are indicative of a response of the sample 101 to the obliquely incident light on the sample 101. Using the output signals, a characteristic of the sample may be determined. By way of example, the output signals from the detector 150 may be monitored to extract the DC value, as well as the 1st and 2nd harmonic at the PEM modulation frequency in the case of a single PEM modulator, and the sum and difference frequencies of the two modulators, as well as the twice the sum and difference frequencies in the case of two PEM modulators. The non-zero frequency signals may be monitored through a digital or analog lock-in-amplification (LIA) process with transimpedance amplifier 151. If desired, a mechanical optical chopper 192 in the beam path allows the measurement of the DC signal to be made by LIA as well. If no mechanical chopper is used, a digital multimeter and appropriate signal isolation and digital or analog low-pass filters may be used. The time constant of the lock-in implication scheme will be set by the signal to noise ratio of the system. For a multi-modulator system, additional demodulators may be used, which may be inside the transimpedance amplifier 151 for LIA, to provide more than one channel, e.g., where there are three signals, there may be three separate single channel LIAs or one 3 channel LIA. The frequency range of the operation of the PEMs 174 and 176 makes the use of a Field-Programmable Gate Array (FPGA) a good approach for simplifying the instrumentation of the transimpedence amplifier 151 and enabling a direct manner of scaling system complexity without increasing hardware.

The detector 150 may be coupled to at least one processor 160, such as a workstation, a personal computer, central processing unit or other adequate computer system, or multiple systems. It should be understood that one processor, multiple separate processors or multiple linked processors may be used, all of which may interchangeably be referred to herein as processor 160, at least one processor 160, one or more processors 160. The processor 160 is preferably included in, or is connected to or otherwise associated with optical metrology device 100. The processor 160, for example, may control the positioning of the sample 101, e.g., by controlling movement of a stage 109 that is coupled to the chuck 108. The stage 109, for example, may be capable of horizontal motion in either Cartesian (i.e., X and Y) coordinates, or Polar (i.e., R and θ) coordinates or some combination of the two. The stage may also be capable of vertical motion along the Z coordinate. The processor 160 may further control the operation of the chuck 108 to hold or release the sample 101. The processor 160 may also collect and analyze the data obtained from the detector 150 as discussed herein. For example, the processor 160 may analyze the data to determine one or more physical characteristics of the sample 101 as discussed below. The processor 160, which includes at least one processing unit 162 with memory 164, as well as a user interface including e.g., a display 166 and input devices 168. A non-transitory computer-usable storage medium 169 having computer-readable program code embodied may be used by the processor 160 for causing the at least one processor to control the optical metrology device 100 and to perform the functions including the analysis described herein. The data structures and software code for automatically implementing one or more acts described in this detailed description can be implemented by one of ordinary skill in the art in light of the present disclosure and stored, e.g., on a computer-usable storage medium 169, which may be any device or medium that can store code and/or data for use by a computer system such as processing unit 162. The computer-usable storage medium 169 may be, but is not limited to, flash drive, magnetic and optical storage devices such as disk drives, magnetic tape, compact discs, and DVDs (digital versatile discs or digital video discs). A communication port 167 may also be used to receive instructions that are used to program the processor 160 to perform any one or more of the functions described herein and may represent any type of communication connection, such as to the internet or any other computer network. The communication port 167 may further export signals, e.g., with measurement results and/or instructions, to another system, such as external process tools, in a feed forward or feedback process in order to adjust a process parameter associated with a fabrication process step of the samples based on the measurement results. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

The raw output of the optical metrology device 100 is a spectra of voltage values versus wavelength set point on, e.g., light source 110. In the case of use of a single PEM 174 or 176, the voltage values are recorded from LIA and are referred to as the DC (chopper frequency), 1F (PEM frequency), and 2F (second harmonic of the PEM frequency) signals. The LIA measure the root mean squared voltage, the chopper halves all signals, and the chopper is a square wave. The measured voltage from the lock in amplifier for DC amplification is multiplied by correction factor, e.g., $\pi/4$, because the DC signal is a square wave and the lock-in only extracts the first component. Hence, two to three demodulations are required depending on whether optical chopper 192 is present used. Depending on the orientation of the optical axis of the polarizing components, the spectra can be used to calculate ellipsometric values N, C and S. If one takes the plane of incidence to be the 0-degree angle direction with rotation clock wise while observing the sample from the source direction being positive, the simplest embodiment of the calculation for the configuration of first polarizer at 45°, PEM at 90°, and analyzing polarizer at +45° is:

$$S=1F/2/J1/DC \qquad \text{eq. 1}$$

$$C=-2F/2/J2/DC \qquad \text{eq. 2}$$

$$N=\sqrt{1-S^2-C^2} \qquad \text{eq. 3}$$

where J1 and J2 are the Bessel functions of the first kind, such that J1=J1(A), and J2=J2(A), where A=2.4048 rad. A plurality of output signals may be generated in this manner, wherein the output signals are indicative of the sample reflection, e.g., the response of the sample to the light that is obliquely incident on the sample. Modeling and a best fit determination may be used to determine a characteristic of a sample.

The optical metrology device 100 may use a narrow bandwidth tunable laser system as its light source 110. Some examples of light sources 110 produce light at the exit of the light source 110 with an extent of 1.5 to 2 mm. A probe size, i.e., spot size, is desired, e.g., smaller than 200 μm and as small as 50 μm. To achieve the desired spot size and at the same time to minimize chromatic aberrations, reflective optical elements may be used, but other types of optical elements, e.g., refractive or a combination of refractive and reflective may be used. Thus, for example, the primary objective lens 122 and receiving objective lens 123 may be matching reflective objectives, such as Schwarzschild objectives. The numerical aperture (NA) of the objectives 122 and 132 that are used to produce the desired probe size may be on the order of 0.3, which is a large value for an ellipsometer. A value on the order of 0.1 is more desirable and is more common for ellipsometers. The increased angular spread implied by the relatively large numerical aperture of objectives 122 and 132 may lead to both a demanding compute problem as well as feature smearing in the raw data. It may be desirable to focus incident light to a small probe size on the sample, but also to limit the range of angles of incidence and/or azimuthal angles that are detected, e.g., to avoid loss of information due to smearing of the signal and demanding computation requirements.

In accordance with one implementation, the effective numerical aperture of the optical system of the optical metrology device is reduced by the spatial filter 180. The conceptual basis of the spatial filter 180 is to recognize the difference between a spatially coherent laser beam and the model of Köhler illumination in a microscope. In a microscope with Köhler illumination, the illumination system delivers a thin cone of rays to a point in the top focal plane of the objective. These rays are collimated by the objective and form a plane wavefront propagating to the sample. The angle of propagation depends on the position of the point in the top focal plane. The extent of the illuminated pupil and the focal length determine the numerical aperture and therefore the range of angles of light approaching the sample. All of the points in the top focal plane are incoherent with respect to each other so all the separate pencils of rays are independent of each other. However, when the illumination in the top focal plane is coherent, i.e., all points in the top focal plane are phase-locked with respect to each other, all the small pencils of rays after the objective are phase-locked with respect to each other so that instead of a lot of small plane wavefronts, they join up to form a large spherical wavefront.

The angle of incidence, however, is dependent on the distribution of flux in the top focal plane of the objective. For example, suppose that the laser beam is very small compared to the pupil of the objective. The angle of the beam emerging from the objective will depend on the position of the beam in the pupil plane of the objective (like the Köhler illuminated objective). Consider the small beam, which is off-center, and what happens as the diameter of the beam in the top focal plane increases. At the extreme of this process, when the beam has expanded so that it is large compared to the pupil of the objective, there will be approximately uniform illumination of the pupil and the spot at the sample will be the Airy disc pattern. The angle of incidence will effectively be determined by the axis of the objective. Between the very-small-beam model and the very-large-beam model there will be condition where both the position of the beam-center and the position of the objective determine the angle of incidence. Accordingly, it is desirable that the beam-steering is accurate.

Figure 2:
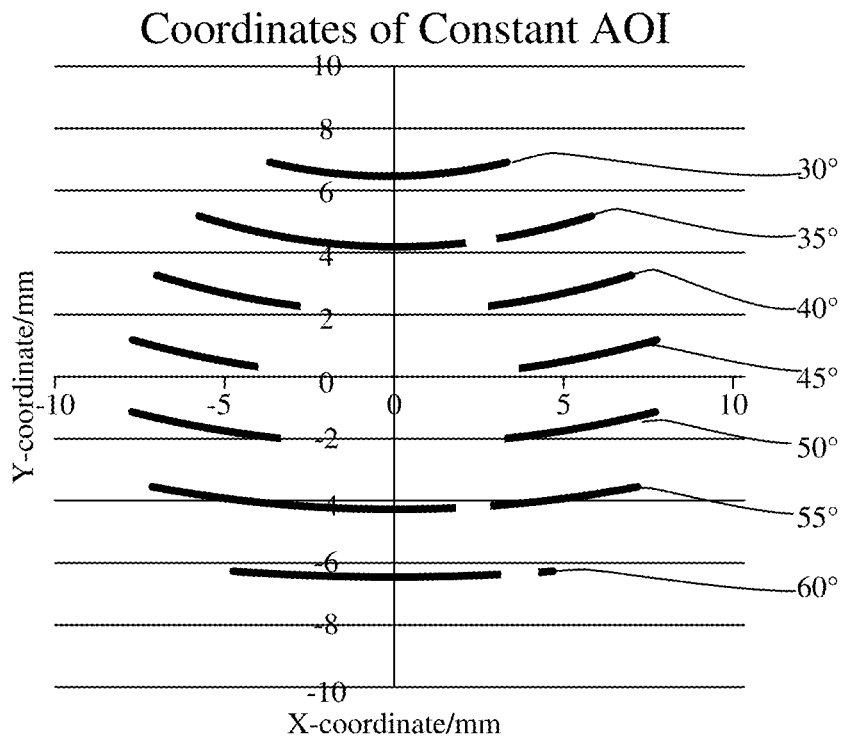
FIG. 2 illustrates coordinates of constant values of angle of incidence of an objective lens.

FIG. 2, by way of example, illustrates coordinates with constant values of angle of incidence in the front of the objective. The angle of incidence values are in degrees. The angle of incidence is measured from the normal to the sample, so low values of angle of incidence are nearer to the top of the aperture of the objective. Only coordinates for the rays that are not vignetted are shown in FIG. 2 so it is possible to visually interpret the limits of the central obscuration and the interruptions due to the spider support in a Schwarzschild objective.

Figure 3:
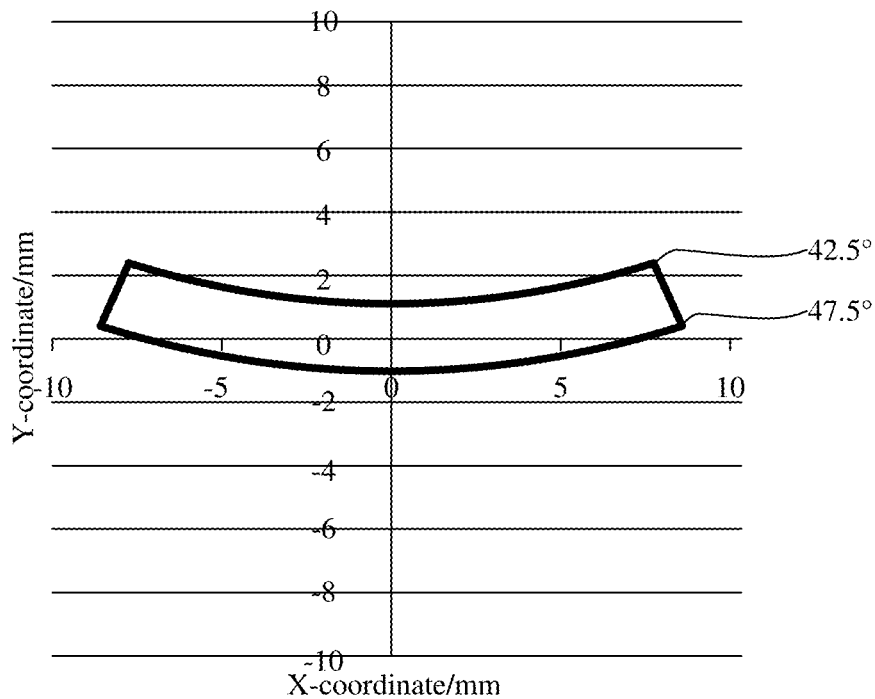
FIG. 3 illustrates aperture coordinates for a spatial filter configured to limit the range of the angle of incidence of an objective lens.
Figure 4:
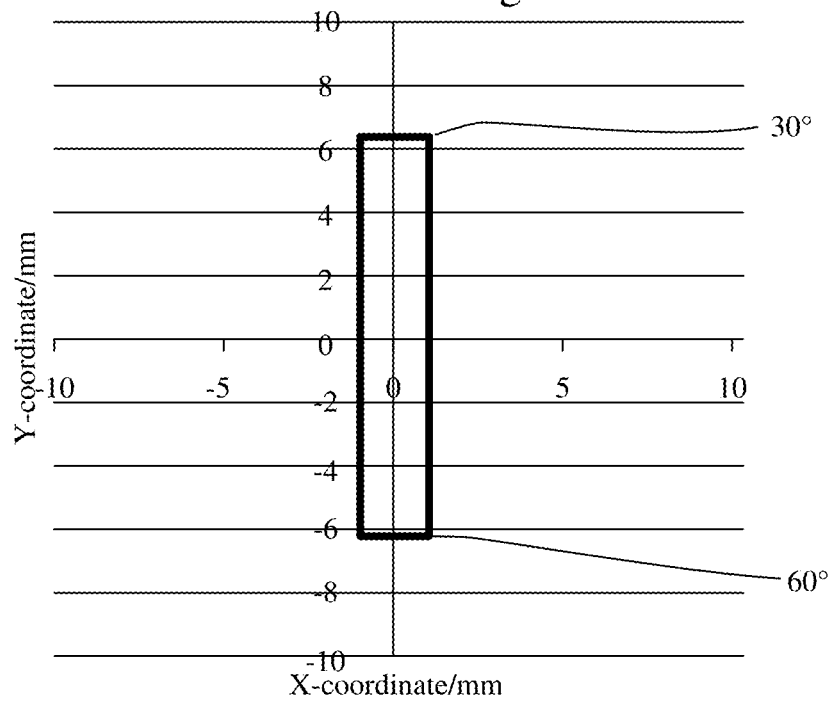
FIG. 4 illustrates aperture coordinates for a spatial filter configured to limit the range of the azimuthal angles of an objective lens.

FIG. 3 illustrates the aperture coordinates for spatial filter 180, if the spatial filter 180 is to be configured to limit the angle of incidence strictly to 45°±2.5°, but to accept a large range of azimuthal angles. If desired, the mask may be limited to other angles of incidence, e.g., 45°±5.0°, 35°±2.5°, etc. FIG. 4 illustrates the aperture coordinates for spatial filter 180, if the spatial filter 180 is to be configured to limit the azimuthal angles, e.g., to 0°±2.5°, but to accept a large range of angles of incidence, e.g., 30° to 60°. If desired, the mask may be limited to other angles of incidence and azimuthal angle ranges.

Figure 5:
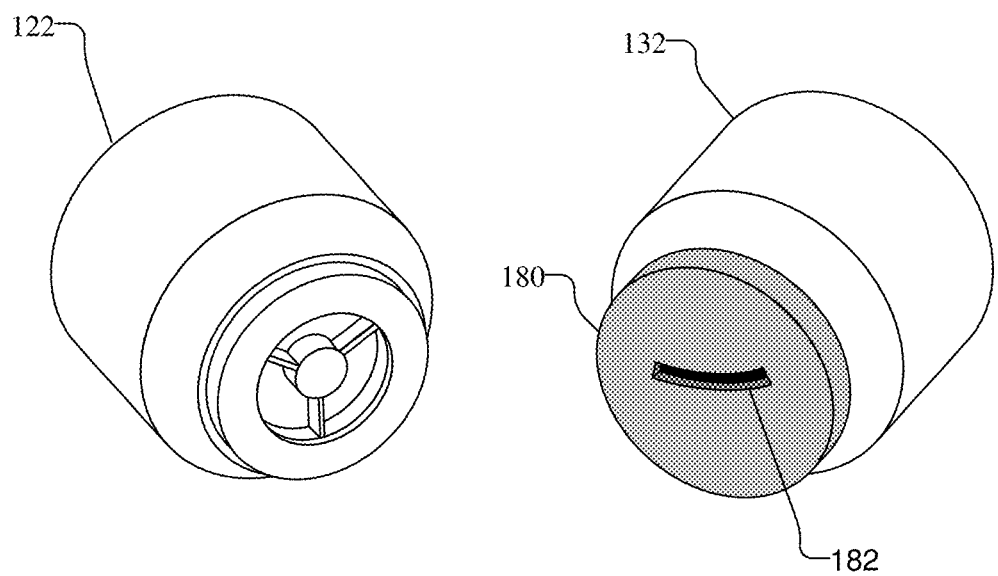
FIG. 5 illustrates a perspective view of a primary objective lens and a receiving objective lens with a spatial filter on the input side of the receiving objective lens.

FIG. 5, by way of example, illustrates perspective views of the primary objective lens 122 and the receiving objective lens 132, which may be matching reflective objectives, such as a Schwarzschild objective. As illustrated, the spatial filter 180 having an aperture 182 configured to limit the angle of incidence, but to accept a large range of azimuthal angles is positioned at the input side of the receiving objective lens 132. The spatial filter 180, for example, may be configured as a cap that is sized to fit over the input side of the receiving objective 132. In other implementations, the spatial filter 180 may be configured to fit over the output side of the receiving objective 132, or over the input side or output side of the primary objective lens 122. The spatial filter 180, for example, may be 3D printed in black polylactic acid (PLA) on a commercial 3D printer, or generated in other manners.

Figure 6A:
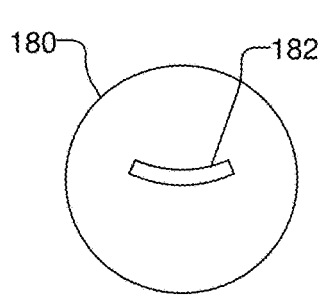
FIGS. 6A-6F illustrate various configurations of the aperture in an spatial filter.

FIGS. 6A-6F illustrate various configurations of the aperture 182 in the spatial filter 180. FIG. 6A, for example, illustrates a configuration of the aperture 182 to limit the angle of incidence, but to accept a large range of azimuthal angles. For example, the aperture 182 in FIG. 6A is positioned at the center of the spatial filter 180 (which may align with the center of the objective lens) and thus, would permit light to pass over a limited range of angles of incidence centered on the optical axis of the objective lens, and light to pass over a greater range of azimuthal angles centered on the optical axis of the objective lens.

Figure 6B:
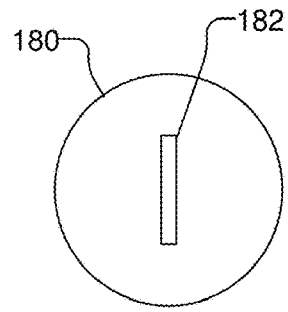

FIG. 6B illustrates a configuration of the aperture 182 that is centered on the optical axis and is configured to permit light to pass over a limited range of azimuthal angles centered on the optical axis, and to pass light over a greater range of angles of incidence centered on the optical axis.

Figure 6C:
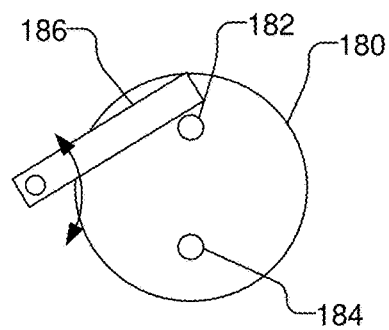

FIG. 6C illustrates a configuration of the spatial filter 180 with multiple apertures 182 and 184, which pass light over limited ranges of both angles of incidence and azimuthal angles, but because there are two apertures 182 and 184 pass light at two different ranges of angles of incidence (as shown). If desired, by rotating spatial filter 180 shown in FIG. 6C by 90 degrees, the apertures 182 and 184 would pass light at two different ranges of azimuthal angles. If desired, the apertures 182 and 184 may be positioned to different ranges of both angle of incidence and azimuthal angle. In use in optical metrology device, one of the two apertures 182 and 184 would be covered so that only one aperture passes light. A movable cover 186 may be moved, e.g., either during calibration or automatically, to selectively block one of the apertures 182 and 184, permitting light to pass through the remaining uncovered aperture.

Figure 6D:
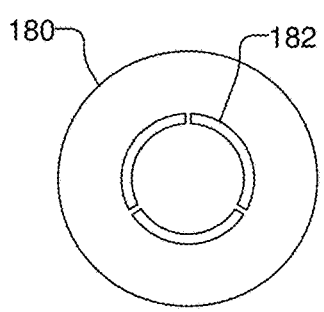

FIG. 6D illustrates an aperture 182 that passes light at a number of angles of incidence and azimuthal angles centered on the optical axis, but does not pass light along the optical axis.

Figure 6E:
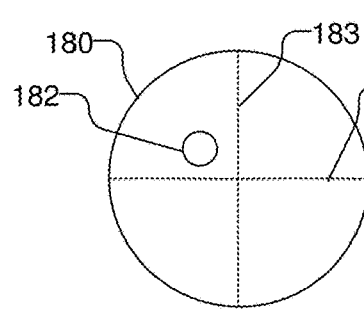

FIG. 6E illustrates an aperture 182 that selects light with a limited range of angles of incidence and limited range of azimuthal angles, which is illustrated as being off-center, i.e., off the center line 183 for the azimuthal angles and off the center line 185 for the angle of incidence, i.e., the ranges of angles of incidence and the ranges of azimuthal angles are not centered on the optical axis. If desired, the aperture 182 may be positioned on center line 183 to center the ranges of azimuthal angles on the optical axis, and/or on the center line 185 to center the ranges of angels of incidence on the optical axis.

Figure 6F:
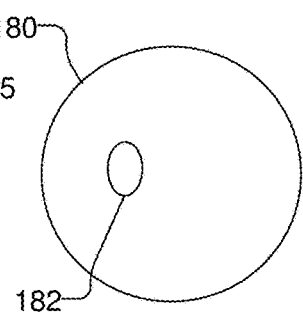

FIG. 6F illustrates another configuration of the off center aperture 182 that selects light with a first range of angles of incidence and second range of azimuthal angles, where the first and second ranges are different, e.g., a larger range of angle of incidence may be accepted than the range of azimuthal angles.

Figure 7A:
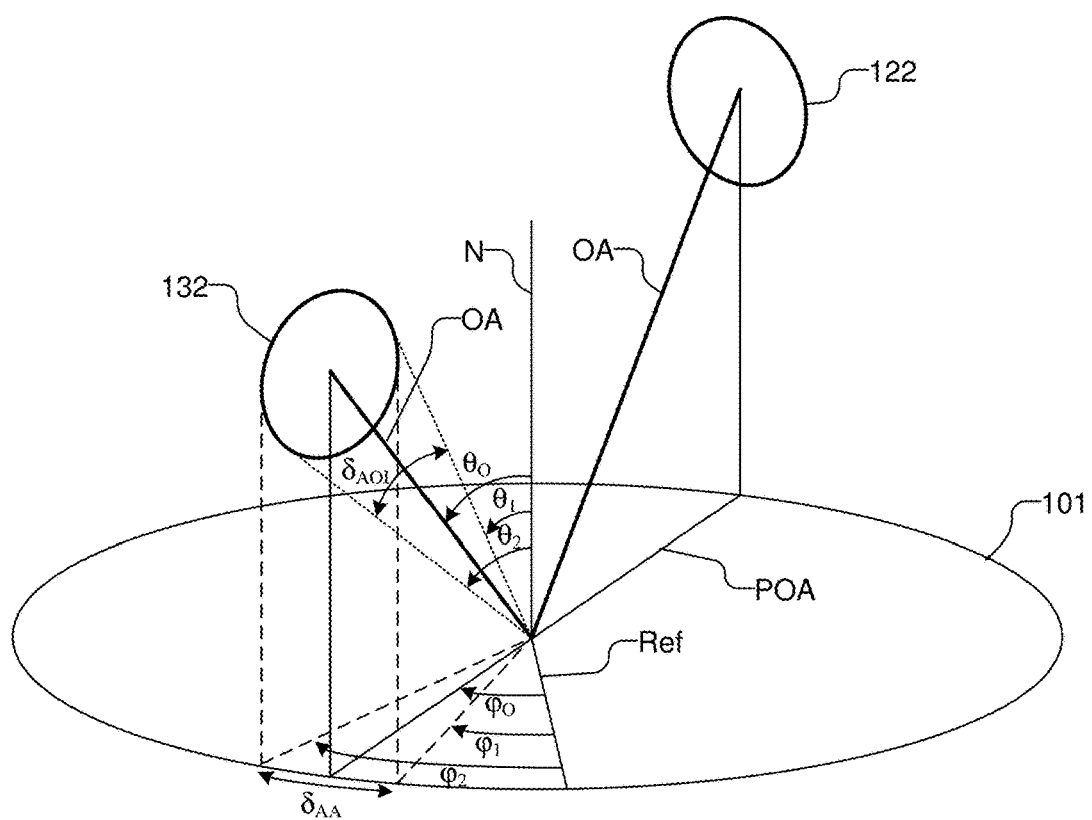
FIGS. 7A-7C illustrate perspective views of the sample and objective lenses with different effective numerical apertures.

FIG. 7A illustrates a perspective view of the sample 101 and objective lenses 122 and 132. The objective lenses 122 and 32 each include an optical axis OA, which is an angle of incidence $\theta_O$ with respect to normal N to the sample 101. The optical axes OA of the objective lenses 122 and 132 form a plane of incidence (POI). Moreover, optical axes OA are at an azimuthal angle $\phi_O$ with respect to the sample 101, as defined by the plane of incidence (POI) relative to a reference orientation (Ref), which may be defined, e.g., based on a flat on the sample or a calibration grating, etc. The angles of incidence and azimuthal angles for the objective lenses 122 and 132 are symmetrical, and thus, only the angles with respect to receiving objective lens 132 are illustrated in FIG. 7A.

The numerical aperture of the objective lenses 122 and 132 is illustrated in FIG. 7 greatly exaggerated by the spatial extent of objective lenses 122 and 132. Accordingly, the objective lenses 122 and 132 has a range of angles of incidence $\delta_{AOI}$ that is $\theta_1$-$\theta_2$, centered on the optical axis OA. Similarly, the objective lenses 122 and 132 has a range of azimuthal angles $\delta_{AA}$ that is $\varphi_1$-$\varphi_2$, centered on the optical axis. For example, with a numerical aperture of 0.3 and an angle of incidence of 45°, the objective lenses 122 and 132 have a range of angles of incidence $\delta_{AOI}$ of ±17.46° around 45°, and the range of azimuthal angles $\delta_{AA}$ is similarly $\delta_{AOI}$ of ±17.46° around the optical axis.

Figure 7B:
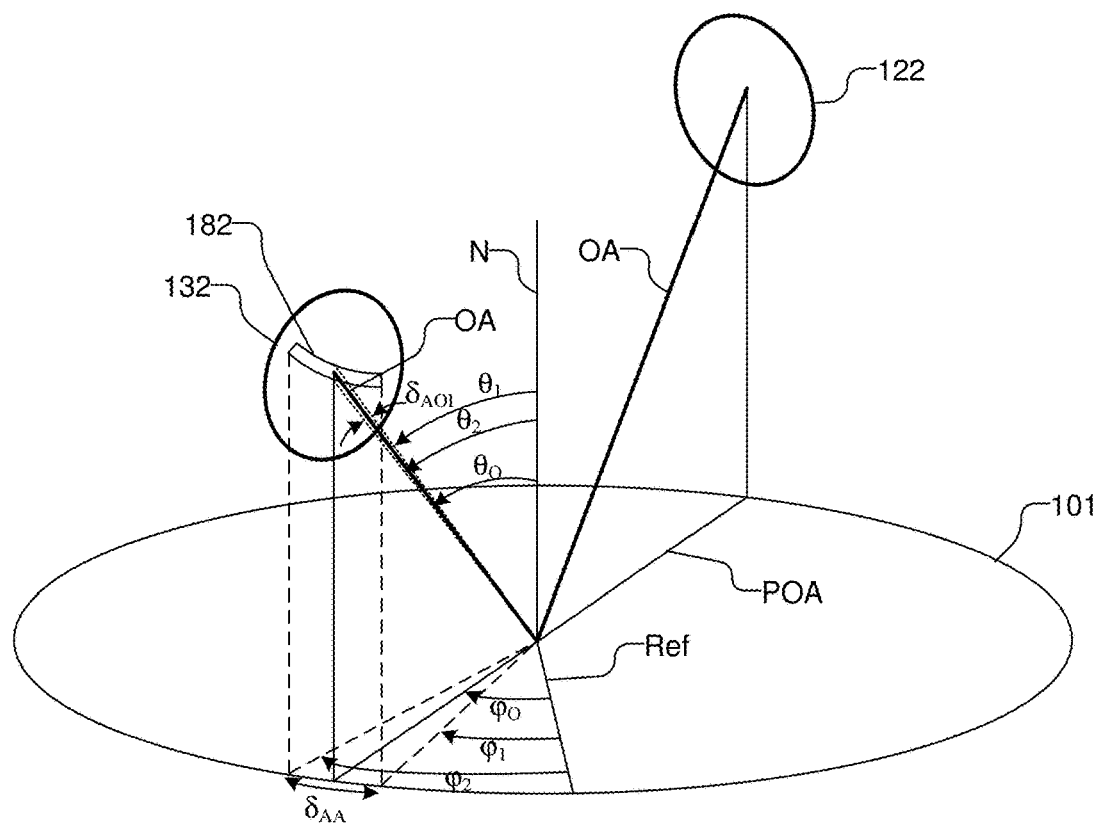

FIG. 7B is similar to FIG. 7A and illustrates a perspective view of the sample 101 and objective lenses 122 and 132, but illustrates an aperture 182 of the spatial filter 180 over the receiving objective lens 132. The aperture 182 permits light to pass over a limited range of angles of incidence $\delta_{AOI}$ but over a relatively large range of azimuthal angles $\delta_{AA}$ and blocks the remaining light. By way of example, aperture 182 of the spatial filter 180 may permit a±2.5° range of angles of incidence around the optical axis, e.g., around 45°, and may permit a±15.0° range of azimuthal angles around the optical axis to pass.

Figure 7C:
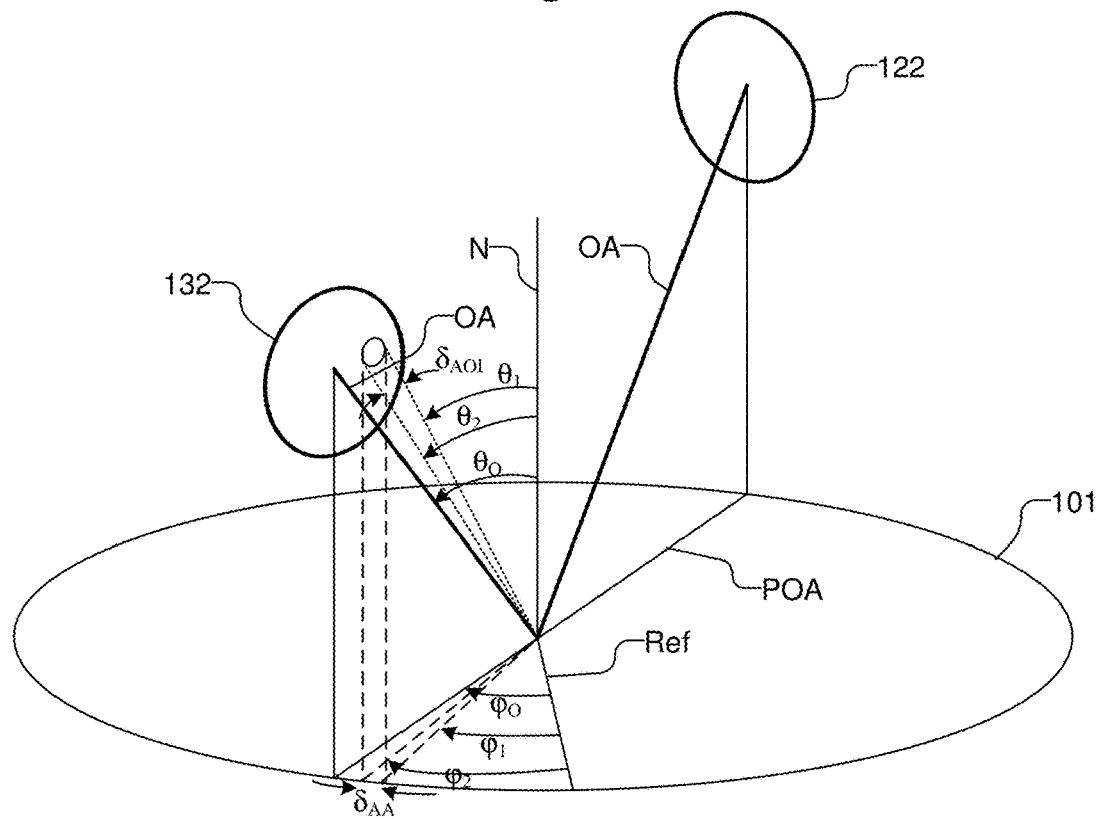

FIG. 7C is similar to FIG. 7A and illustrates a perspective view of the sample 101 and objective lenses 122 and 132, but illustrates another implementation of the aperture 182 of the spatial filter 180 over the receiving objective lens 132. FIG. 7C illustrates the aperture 182 permits light to pass over a limited range of angles of incidence $\delta_{AOI}$ and over a limited range of azimuthal angles $\delta_{AA}$, both of which are off-center, and blocks the remaining light. By way of example, aperture 182 of the spatial filter 180 in FIG. C may permit a±2.5° range of angles of incidence around a center angle of incidence of, e.g., 40°, and may permit a±2.5° range of azimuthal angles around a center azimuthal angle, which is not centered on the optical axis.

Figure 8A:
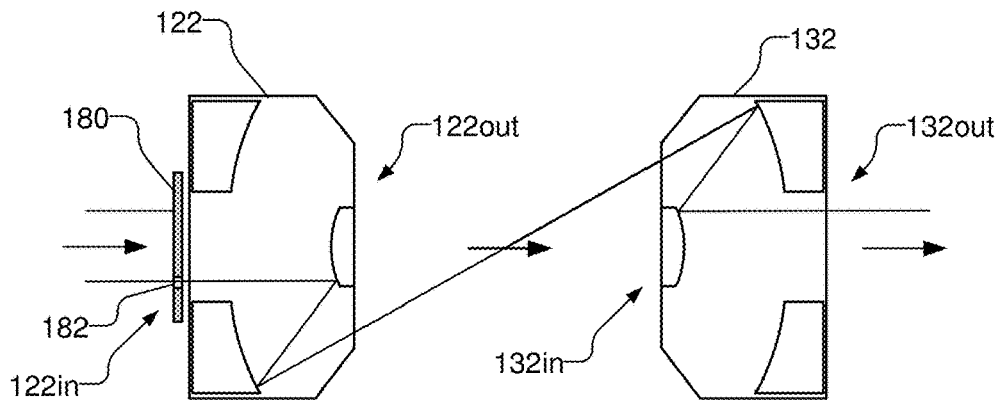
FIGS. 8A-8D illustrates cross sectional views of Schwarzschild type primary objective lens and receiving objective lens and various locations for the spatial filter to block light
Figure 8B:
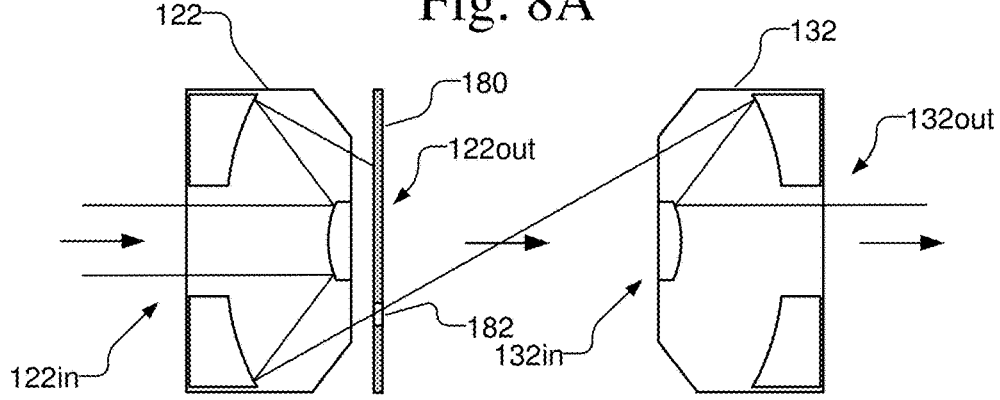
Figure 8C:
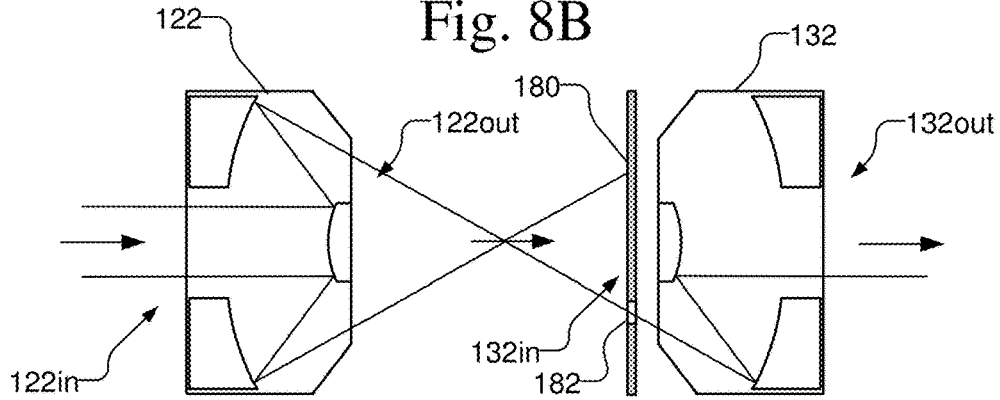
Figure 8D:
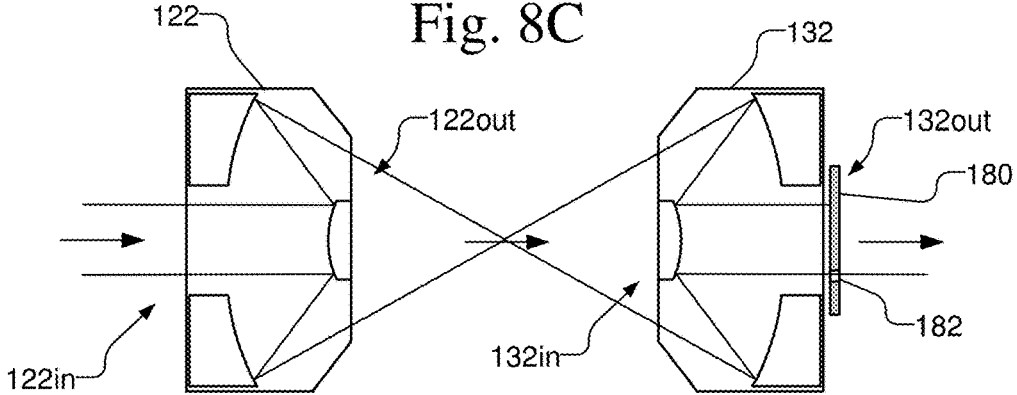

FIGS. 8A-8D illustrates cross sectional views of Schwarzschild type objective lenses 122 and 132 and various locations for the spatial filter 180 that blocks light except for light that passes through the aperture 182. By way of example, as illustrated in FIG. 8A, the spatial filter 180 positioned over the input side 122in of the primary objective lens 122 at a back focal plane of the objective lens 122. FIG. 8B illustrates the spatial filter 180 positioned over the output side 122out of the primary objective lens 122, between the objective lens 122 and the sample. FIG. 8C illustrates the spatial filter 180 positioned over the input side 132in of the receiving objective lens 132, e.g., between the sample and objective lens 132. FIG. 8D illustrates the spatial filter 180 positioned over the output side 132out of the receiving objective lens 132 at the back focal plane of the objective lens 132. Additionally, as illustrated in FIG. 1, the spatial filter 180 may be positioned between the receiving objective lens 132 and the detector 150, at a conjugate plane between two focusing elements 142 and 144. Thus, the spatial filter 180 may be located in various positions with respect to the objective lenses 122 and 132.

Figure 9A:
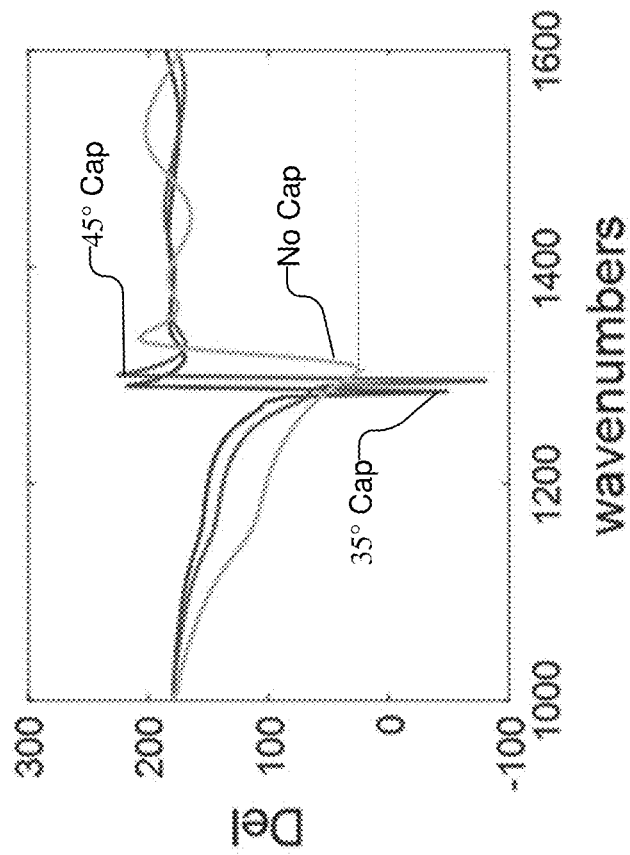
FIGS. 9A and 9B illustrate experimental and simulated results, respectively, for data collected from a sample using an objective lens with and without a spatial filter.
Figure 9B:
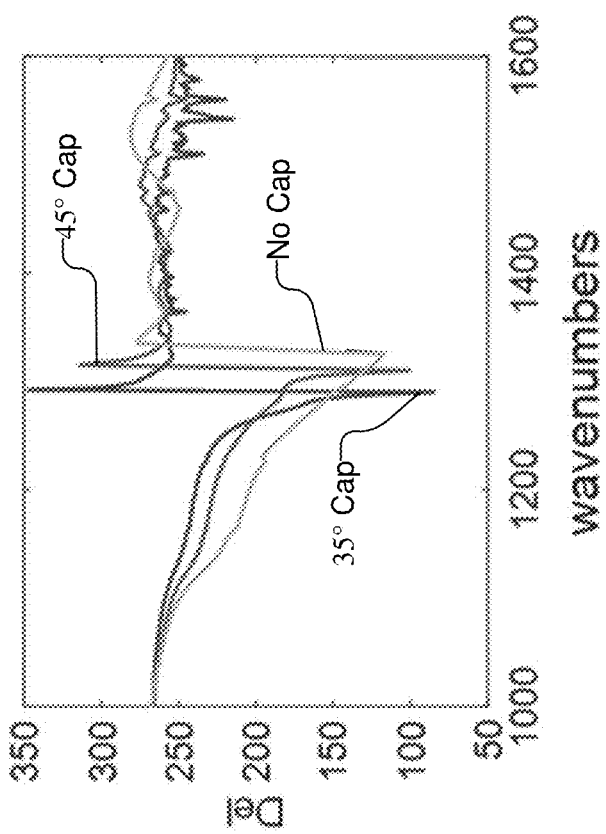

FIGS. 9A and 9B illustrate the experimental (FIG. 9A) and simulated (FIG. 9B) results of a series of measurements on a 2.2 µm thermal $SiO_2$ film deposited on a single crystal [100] silicon sample, over a number of wavelengths. For the experimental graph (FIG. 9), measurements of ellipsometric value delta were collected without a spatial filter, e.g., no cap, and with two variants of the spatial filter 180 with differing angular ranges, e.g., a spatial filter cap that accepts angles of incidence of 45°±2.5°, and a spatial filter cap that accepts angles of incidence of 35°±2.5°. As can be seen in the experimental graph (FIG. 9A), the variations in the range of angles incidence caused by the use of the spatial filter alters the measured response. The simulated graph (FIG. 9B) simulates the experimental measurements with the above-conditions using an optical model of the system. As can be seen, the simulated graph (FIG. 9B) agrees well with the experimental graph (FIG. 9A). The agreement between the experimental and simulated graphs indicates that the reduction in the numerical aperture of the optical system and selection of a desired angle of incidence using the spatial filter 180 may be accurately modeled and used for measurement of one or more characteristics of a sample.

Figure 10:
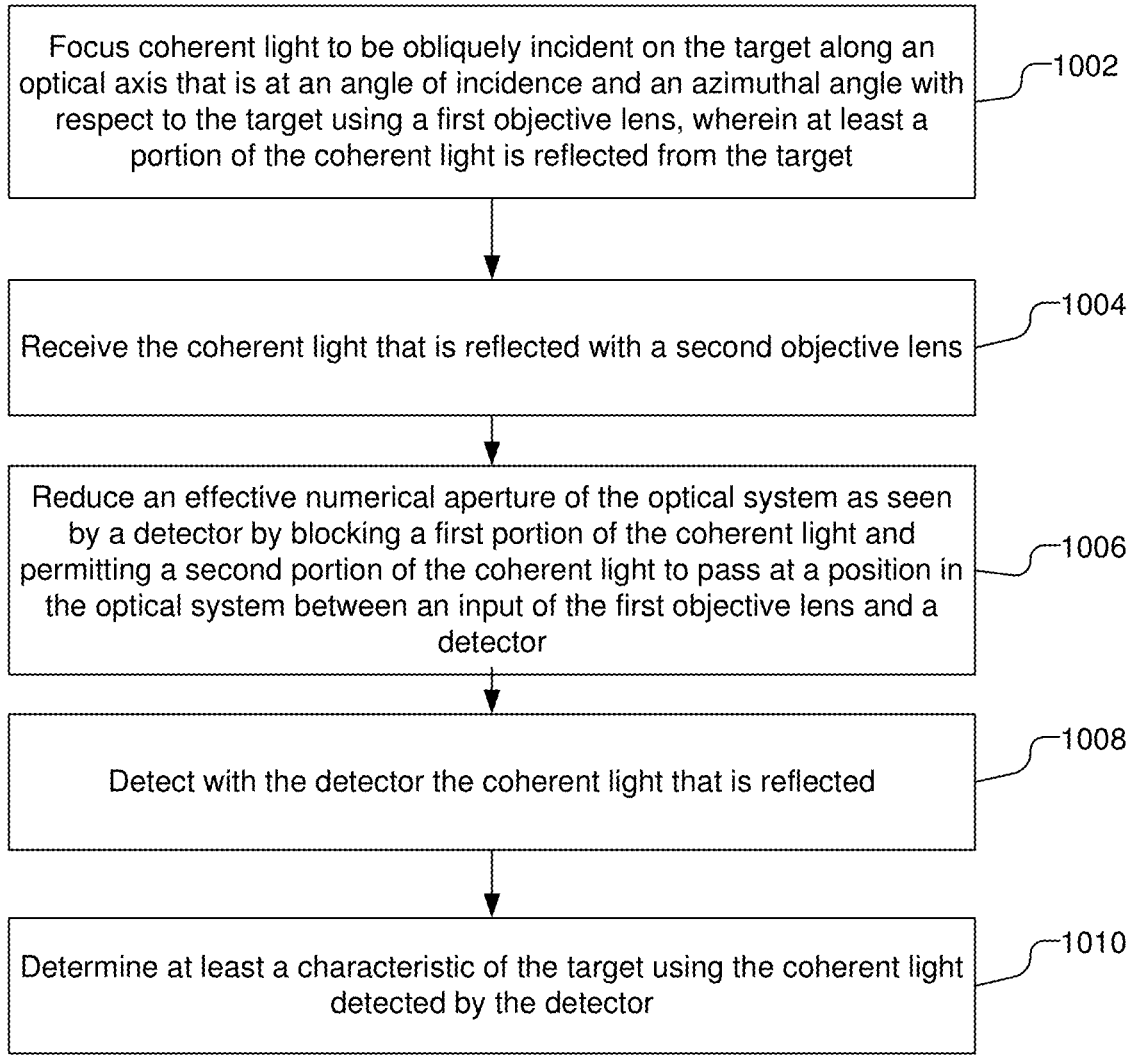
FIG. 10 is a flow chart illustrating a method of performing optical measurements of at least one characteristic of a sample with an optical metrology device that includes a spatial filter.

FIG. 10 is a flow chart illustrating a method of performing optical measurements of at least one characteristic of a target performed by an optical metrology device having an optical system, e.g., metrology device 100. As illustrated, coherent light is focused to be obliquely incident on the target along an optical axis that is at an angle of incidence and an azimuthal angle with respect to the target using a first objective lens, wherein at least a portion of the coherent light is reflected from the target (1002). The coherent light that is reflected is received with a second objective lens (1004). An effective numerical aperture of the optical system as seen by a detector is reduced by blocking a first portion of the coherent light and permitting a second portion of the coherent light to pass at a position in the optical system between an input of the first objective lens and a detector (1006). The coherent light that is reflected is detected with the detector (1008). A characteristic of the target is determined using the coherent light detected by the detector (1010).

In some implementations, the coherent light may be infrared light, e.g., in the spectral range between 2.5 µm and 30 µm, and the first objective lens and the second objective lens may be reflective optical elements. Additionally, in some implementations, the angle of incidence may be between 30° and 70°. The first objective lens may have a numerical aperture that is sufficient to focus the coherent light into a measurement spot of less than 200 µm in its largest dimension, and the blocking is between the target and the detector. The second portion of the coherent light may be permitted to pass in at least one of a first range of angle of incidence and a second range of azimuthal angle, or a combination thereof.

In some implementations, the input of the first objective lens is a back focal plane, and the blocking may be at one of the back focal plane of the first objective lens, between the first objective lens and the second objective lens, at the back focal plane of the second objective lens, and between the second objective lens and the detector in a conjugate plane between two lenses.

In some implementations, the method may further include moving a cover to selectively cover one of two apertures to permit the second portion of the coherent light to pass at one of two different ranges of angles of incidence or two different ranges of azimuthal angles.

In some implementations, the first objective lens and the second objective lens may have matching numerical apertures and blocking the first portion of the coherent light may prevent the use of a full spatial extent of at least one of the first objective lens and the second objective lens.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An optical metrology device for measuring at least one characteristic of a target, the optical metrology device comprising:
    an optical system comprising:
        a first objective lens that is configured to receive a coherent light and focus the coherent light to be obliquely incident on the target, wherein an optical axis of the first objective lens is at an angle of incidence and an azimuthal angle with respect to the target, wherein at least a portion of the coherent light is reflected;
        a second objective lens that is configured to receive the coherent light that is reflected,
        a detector that is configured to receive the coherent light that is reflected and produce signals in response;
        a spatial filter that is configured to reduce an effective numerical aperture of the optical system as seen by the detector, the spatial filter is positioned in the optical system between an input of the first objective lens and the detector and the spatial filter blocks a first portion of the coherent light from exiting the spatial filter and permits a second portion of the coherent light to pass, wherein the spatial filter comprise two separate apertures that permit the coherent light in the optical system to pass at two different ranges of angles of incidence or two different ranges of azimuthal angles, the optical metrology device further comprising a movable cover that moves to selectively cover one of the two separate apertures; and
    at least one processor coupled to receive the signals from the detector, the at least one processor configured to determine at least a characteristic of the target using the signals from the detector.

2. The optical metrology device of claim 1, wherein the coherent light is infrared light and the first objective lens and the second objective lens are reflective optical elements.

3. The optical metrology device of claim 1, wherein the input of the first objective lens is a back focal plane, and the spatial filter is positioned at one of the back focal plane of the first objective lens, between the first objective lens and the second objective lens, at the back focal plane of the second objective lens, and between the second objective lens and the detector in a conjugate plane between two lenses.

4. The optical metrology device of claim 1, wherein the spatial filter permits the second portion of the coherent light to pass in at least one of a first range of angle of incidence and a second range of azimuthal angle, or a combination thereof.

5. The optical metrology device of claim 1, wherein the first objective lens has a numerical aperture sufficient to focus the coherent light into a measurement spot of less than 200 μm in its largest dimension, and the spatial filter is positioned in the optical system between the target and the detector.

6. The optical metrology device of claim 1, wherein the first objective lens and the second objective lens have matching numerical apertures and wherein the spatial filter prevents use of a full spatial extent of at least one of the first objective lens and the second objective lens.

7. A method for performing optical measurements of at least one characteristic of a target performed by an optical metrology device having an optical system, the method comprising:
focusing coherent light to be obliquely incident on the target along an optical axis that is at an angle of incidence and an azimuthal angle with respect to the target using a first objective lens, wherein at least a portion of the coherent light is reflected from the target;
receiving the coherent light that is reflected with a second objective lens;
reducing an effective numerical aperture of the optical system as seen by a detector by blocking a first portion of the coherent light and permitting a second portion of the coherent light to pass at a position in the optical system between an input of the first objective lens and the detector;
moving a cover to selectively cover one of two apertures to permit the second portion of the coherent light to pass at one of two different ranges of angles of incidence or two different ranges of azimuthal angles;
detecting with the detector the coherent light that is reflected; and
determining at least a characteristic of the target using the coherent light detected by the detector.

8. The method of claim 7, wherein the coherent light is infrared light and the first objective lens and the second objective lens are reflective optical elements.

9. The method of claim 7, wherein the input of the first objective lens is a back focal plane, and wherein the blocking is at one of the back focal plane of the first objective lens, between the first objective lens and the second objective lens, at the back focal plane of the second objective lens, and between the second objective lens and the detector in a conjugate plane between two lenses.

10. The method of claim 7, wherein the second portion of the coherent light is permitted to pass in at least one of a first range of angle of incidence and a second range of azimuthal angle, or a combination thereof.

11. The method of claim 7, wherein the first objective lens has a numerical aperture sufficient to focus the coherent light into a measurement spot of less than 200 μm in its largest dimension, and the blocking in the optical system is between the target and the detector.

12. The method of claim 7, wherein the first objective lens and the second objective lens have matching numerical apertures and wherein blocking the first portion of the coherent light prevents use of a full spatial extent of at least one of the first objective lens and the second objective lens.

13. An optical metrology device for measuring at least one characteristic of a target, the optical metrology device comprising:
an optical system comprising:
a first objective lens that is configured to receive coherent light and focus the coherent light to be obliquely incident on the target, wherein an optical axis of the first objective lens is at an angle of incidence and an azimuthal angle, wherein at least a portion of the coherent light is reflected;
a second objective lens that is configured to receive the coherent light that is reflected, the second objective lens is separate from the first objective lens;
a detector that is configured to receive the coherent light that is reflected and produce signals in response; and
a means for reducing an effective numerical aperture of the optical system as seen by the detector;
a means for selecting between one of two different ranges of angles of incidence or two different ranges of azimuthal angles; and
at least one processor coupled to receive the signals from the detector, the at least one processor configured to determine at least a characteristic of the target using the signals from the detector.

14. The optical metrology device of claim 13, wherein the coherent light is infrared light and the first objective lens and the second objective lens are reflective optical elements.

15. The optical metrology device of claim 1, wherein the means for reducing the effective numerical aperture of the optical system is positioned in the optical system at one of a back focal plane of the first objective lens, between the first objective lens and the second objective lens, at the back focal plane of the second objective lens, and between the second objective lens and the detector in a conjugate plane between two lenses.

16. The optical metrology device of claim 13, wherein the first objective lens has a numerical aperture sufficient to focus the coherent light into a measurement spot of less than 200 μm in its largest dimension, and the means for reducing the effective numerical aperture of the optical system is positioned in the optical system between the target and the detector.

17. The optical metrology device of claim 13, wherein the first objective lens and the second objective lens have matching numerical apertures and wherein the means for reducing the effective numerical aperture of the optical system prevents use of a full spatial extent of at least one of the first objective lens and the second objective lens.

* * * * *